US012587071B2

(12) United States Patent
Yoshimi et al.

(10) Patent No.: US 12,587,071 B2
(45) Date of Patent: Mar. 24, 2026

(54) DRIVE DEVICE

(71) Applicant: DENSO CORPORATION, Kariya-city (JP)

(72) Inventors: Tomoaki Yoshimi, Kariya-city (JP); Yasufumi Matsuo, Kariya-city (JP); Kunihiko Matsuda, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 202 days.

(21) Appl. No.: 18/511,606

(22) Filed: Nov. 16, 2023

(65) Prior Publication Data

US 2024/0088758 A1 Mar. 14, 2024

Related U.S. Application Data

(63) Continuation of application No. PCT/JP2022/020060, filed on May 12, 2022.

(30) Foreign Application Priority Data

May 20, 2021 (JP) ................................. 2021-085283

(51) Int. Cl.
*H02K 11/30* (2016.01)
*H02K 5/22* (2006.01)

(52) U.S. Cl.
CPC ............. *H02K 11/30* (2016.01); *H02K 5/225* (2013.01)

(58) Field of Classification Search
CPC ...... H02K 11/30; H02K 5/225; H02K 11/215; H02K 2211/03; H02K 2213/12; H02K 11/33; B62D 5/04

USPC .......................................................... 310/195
See application file for complete search history.

(56) References Cited

U.S. PATENT DOCUMENTS

| | | | |
|---|---|---|---|
| 2008/0024975 A1* | 1/2008 | Huang | G06F 1/1679 |
| | | | 361/679.44 |
| 2015/0156927 A1 | 6/2015 | Tsuboi | |
| 2016/0036304 A1* | 2/2016 | Yamasaki | B62D 5/0412 |
| | | | 310/68 B |
| 2017/0291635 A1 | 10/2017 | Yamasaki | |
| 2019/0126973 A1 | 5/2019 | Yamasaki | |
| 2019/0310150 A1 | 10/2019 | Horiba et al. | |

(Continued)

FOREIGN PATENT DOCUMENTS

| | | |
|---|---|---|
| JP | 2021-033794 A | 3/2021 |
| JP | 2022-144150 A | 10/2022 |
| JP | 2022-144169 A | 10/2022 |

(Continued)

*Primary Examiner* — Ahmed Elnakib
(74) *Attorney, Agent, or Firm* — Precision Patents, P.C

(57) ABSTRACT

A drive device includes a motor with two sets of motor windings and a control unit. The control unit has a board on which an electronic component related to energization control of the motor windings are mounted, a connector unit, and a cover member that covers control components including the board, and is provided on one side in a axial direction of the motor. The connector unit has two main connectors and at least one sub connector used for connection with an outside, and these openings are provided so as to face a side opposite to the motor. The main connectors are connected with a power supply and a communication network. The sub connector has an opening separate from that of the main connector and is connected to a separate member.

6 Claims, 14 Drawing Sheets

(56) References Cited

U.S. PATENT DOCUMENTS

| | | | |
|---|---|---|---|
| 2021/0009192 A1* | 1/2021 | Yamasaki | ............ B62D 5/0403 |
| 2021/0261187 A1 | 8/2021 | Ishii et al. | |

FOREIGN PATENT DOCUMENTS

| | | | |
|---|---|---|---|
| JP | 2022-144197 A | 10/2022 | |
| WO | WO 2021059796 | * | 4/2021 |

* cited by examiner

DRIVE DEVICE

CROSS REFERENCE TO RELATED APPLICATIONS

This application is a continuation application of International Patent Application No. PCT/JP2022/020060 filed on May 12, 2022, which designated the U.S. and based on and claims the benefits of priority of Japanese Patent Application No. 2021-085283 filed on May 20, 2021. The entire disclosure of all of the above applications is incorporated herein by reference.

TECHNICAL FIELD

The present disclosure relates to a drive device.

BACKGROUND

Conventionally, there is known a drive device in which a motor and a control unit for controlling the motor are integrally provided.

SUMMARY

An object of the present disclosure is to provide a drive device capable of improving assembly efficiency.

The drive device of the present disclosure includes a motor with two sets of motor windings and a control unit. The control unit has a board on which an electronic component related to energization control of the motor windings are mounted, a connector unit, and a cover member that covers the control components including the board, and is provided on one side in a axial direction of the motor.

The connector unit is provided with two main connectors and an opening of at least one sub connector used for connection with the outside and openings thereof faces a side opposite to the motor. The main connector is connected with a power source and a communication network. The sub connector has an opening separate from that of the main connector and is connected to a separate member. By providing separate openings for the main connector and the sub connector, it is possible to improve assembly efficiency.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
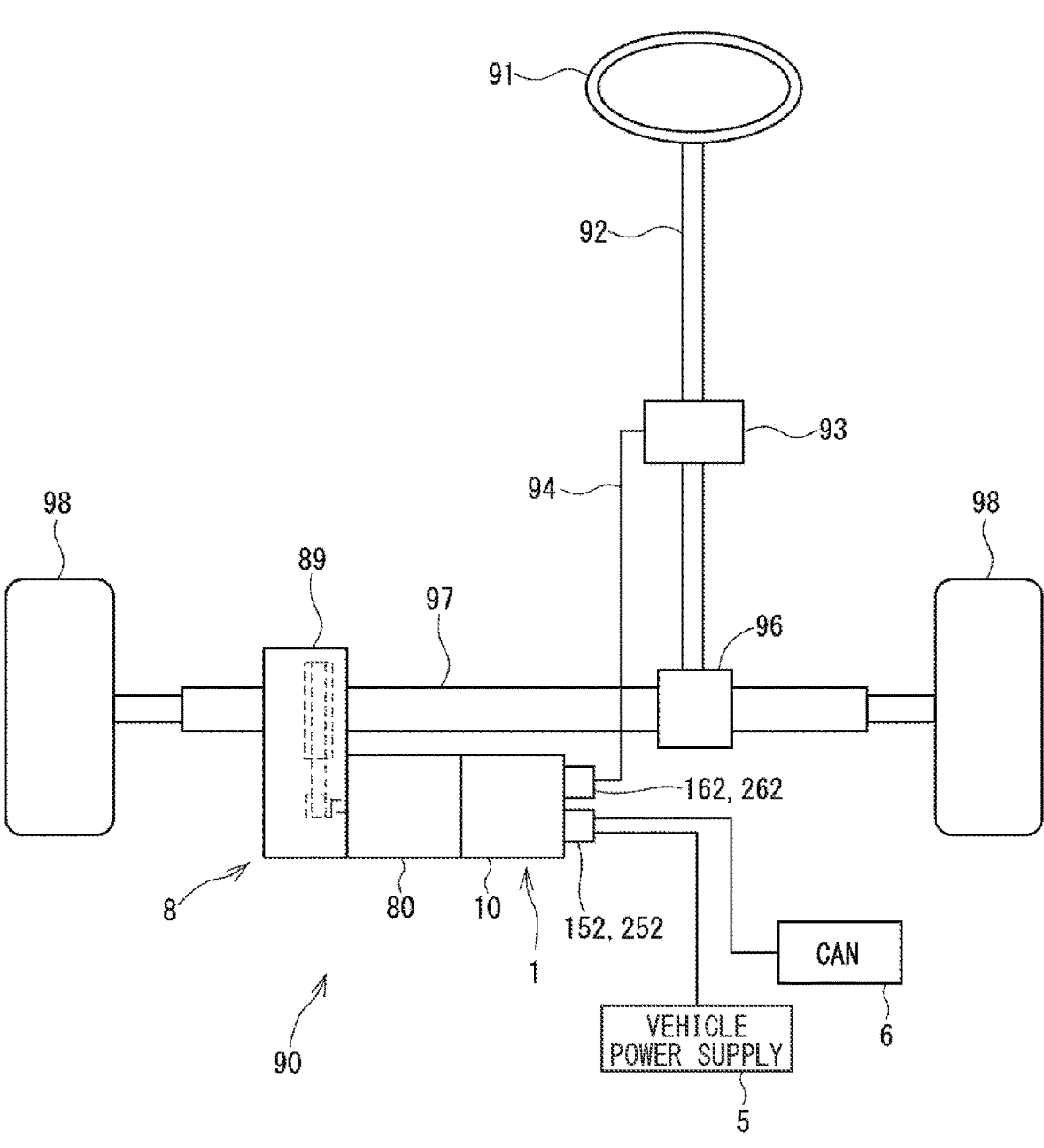
FIG. 1 is a schematic structural view illustrating a steering system according to a first embodiment.
Figure 2:
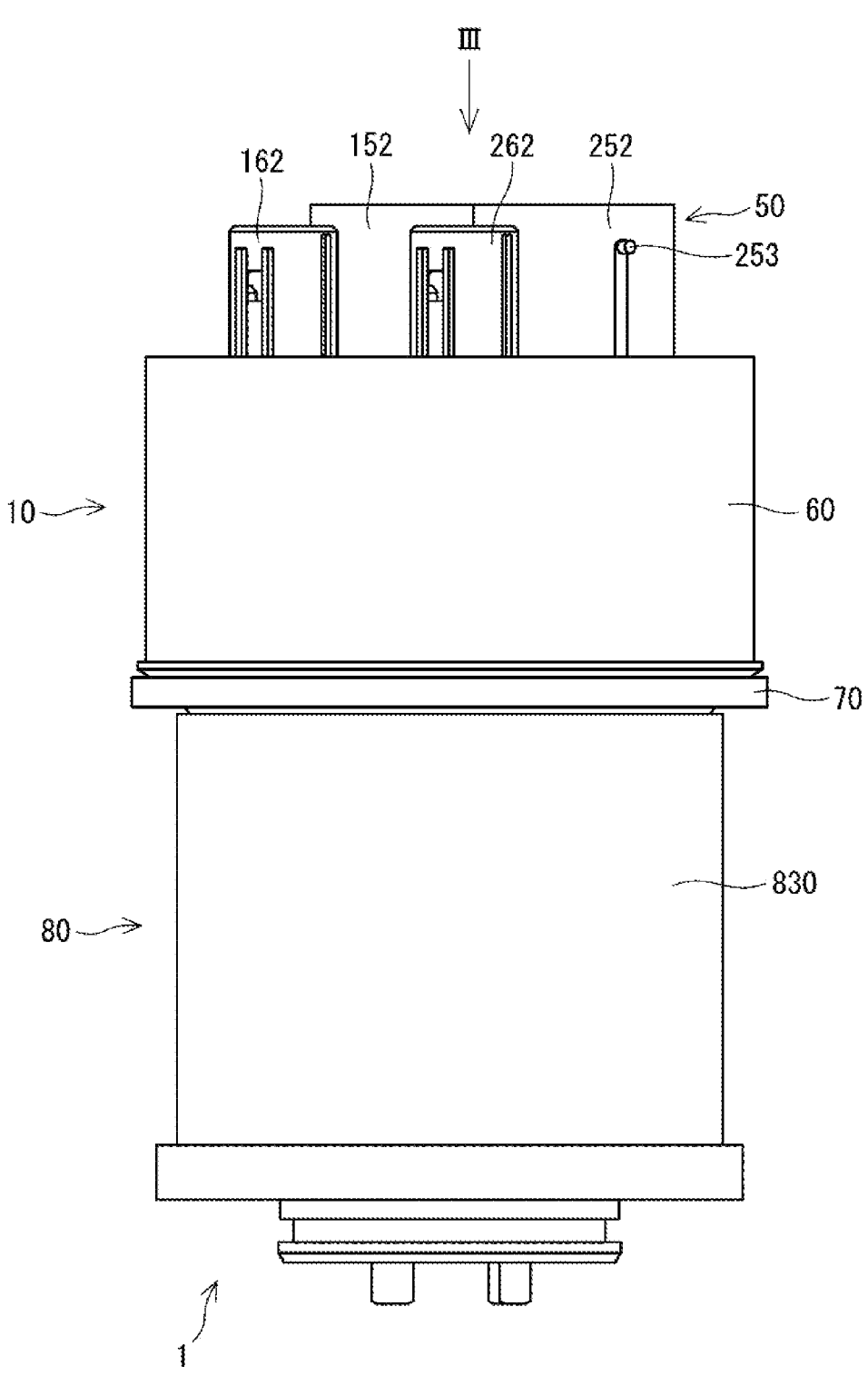
FIG. 2 is a side view illustrating a drive device according to the first embodiment.

In an assumable example, there is known a drive device in which a motor and a control unit for controlling the motor are integrally provided. Two connector openings are provided in a redundant configuration having two winding systems.

One connector is provided with a power terminal of one system, a vehicle communication terminal, and a torque signal terminal. The drive device is applied to an electric power steering device, and after the electric power steering device is assembled to a vehicle, a connector that integrates a vehicle wiring and a sensor wiring is fitted to a connector of the drive device. However, since a torque sensor is provided on a steering shaft, it is desirable to assemble the torque signal terminal and the torque sensor at the stage of assembling the driving device to the steering shaft. An object of the present disclosure is to provide a drive device capable of improving assembly efficiency.

The drive device of the present disclosure includes a motor with two sets of motor windings and a control unit. The control unit has a board on which an electronic component related to energization control of the motor windings are mounted, a connector unit, and a cover member that covers the control components including the board, and is provided on one side in an axial direction of the motor.

The connector unit is provided with two main connectors and an opening of at least one sub connector used for connection with the outside and openings thereof faces a side opposite to the motor. The main connector is connected with a power source and a communication network. The sub connector has an opening separate from that of the main connector and is connected to a separate member. By providing separate openings for the main connector and the sub connector, it is possible to improve assembly efficiency.

A drive device according to the present disclosure will be described below with reference to the drawings. In the following plural embodiments, substantially same structural configurations are designated with the same reference numerals thereby to simplify the description.

First Embodiment

The drive device according to a first embodiment is shown in FIGS. 1 to 7. As shown in FIG. 1, a drive device 1 includes a motor 80 and an ECU 10 as an electronic control unit, and is applied to an electric power steering device 8, which is a steering device for assisting a steering operation of a vehicle. FIG. 1 shows an overall configuration of a steering system 90 including the electric power steering device 8. The steering system 90 includes a steering wheel 91, a steering shaft 92, a pinion gear 96, a rack shaft 97, road wheels 98, the electric power steering device 8 and the like.

The steering wheel 91 is connected to the steering shaft 92. A torque sensor 93 is provided on the steering shaft 92 to detect a steering torque. The torque sensor 93 is connected to steering system connectors 162 and 262 by a harness 94. The torque sensor 93 is internally divided into two systems, and the respective detected values are input to the steering system connectors 162 and 262 of the corresponding system. The pinion gear 96 is provided at an axial end of the steering shaft 92. The pinion gear 96 meshes with the rack shaft 97. A pair of road wheels 98 is coupled at both ends of the rack shaft 97 via, for example, tie rods.

When a driver of the vehicle rotates the steering wheel 91, the steering shaft 92 connected to the steering wheel 91 rotates. A rotational movement of the steering shaft 92 is converted into a linear movement of the rack shaft 97 by the pinion gear 96. The pair of road wheels 98 is steered to an angle corresponding to the displacement amount of the rack shaft 97.

The electric power steering device 8 includes the drive device 1, a reduction gear 89 as a power transmission unit that reduces the rotation of the motor 80 and transmits the rotation to the rack shaft 97, and the like. The electric power steering device 8 of the present embodiment is a so-called "rack assist type", but may be a so-called "column assist type" or the like that transmits the rotation of the motor 80 to the steering shaft 92.

The motor 80 is a three-phase brushless motor. The motor 80 outputs part or all of a torque required for steering, and is driven by a power supplied from a battery (not shown) to rotate the reduction gear 89 forward and backward. The motor 80 has a first motor winding 180 and a second motor winding 280 (see FIG. 4, etc.).

Hereinafter, a combination of configurations relating to the energization control of the first motor winding 180 will be referred to as a first system, and a combination of configurations relating to the energization control of the second motor winding 280 will be referred to as a second system. The configuration of the first system is mainly numbered in the 100s, the configuration of the second system is mainly numbered in the 200s, and the lower 2 digits are substantially the same for the first and second systems. With this numbering of reference numerals, the description will be simplified. As appropriate, an index of "1" is added to a component or a value related to the first system, and an index of "2" is added to a component or a value related to the second system.

As shown in FIGS. 2 to 7, the drive device 1 has the ECU 10 integrally provided on one side of the motor 80 in an axial direction, which is so-called "mechanical and electrical integrated type". The ECU 10 is positioned coaxially with an axis Ax of a shaft 870 on the side opposite to the output shaft of the motor 80. Here, in the meaning "coaxially", errors and deviations related to assembly and design are allowed, for example. A "mechanical and electrical integration" of the driving device 1 of the present embodiment is different from a structure in which, for example, a substantially rectangular parallelepiped ECU is simply placed close to the motor 80. By adopting the mechanical and electrical integrated type, it may be possible to efficiently position the ECU 10 and the motor 80 in a vehicle having restriction for mounting space. Hereinafter, an axial direction of the motor 80 will be regarded as an axial direction of the driving device 1, and simply referred to as "axial direction".

Figure 4:
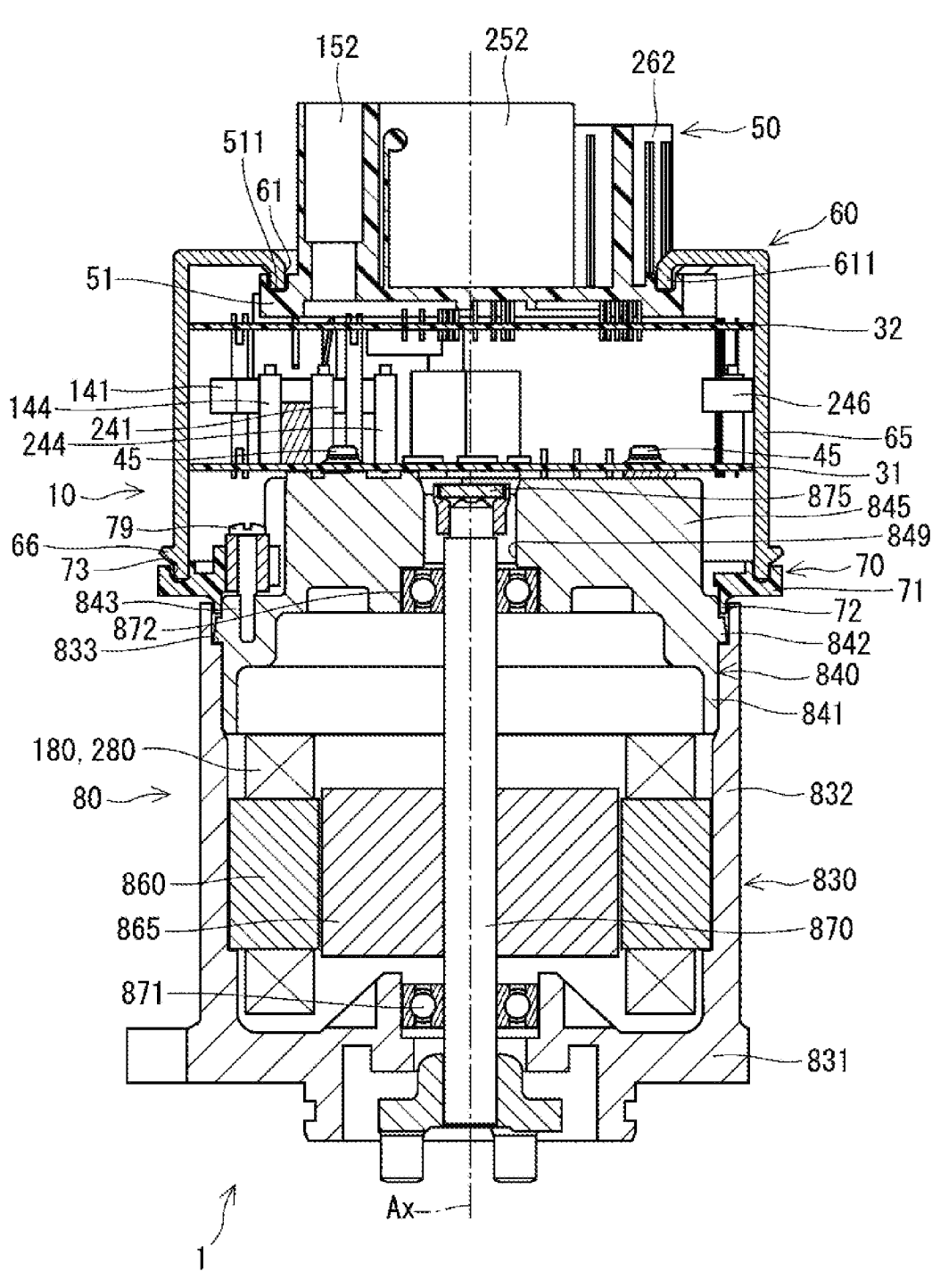
FIG. 4 is a diagram illustrating a cross-sectional view taken along a line IV-IV of FIG. 3.
Figure 5:
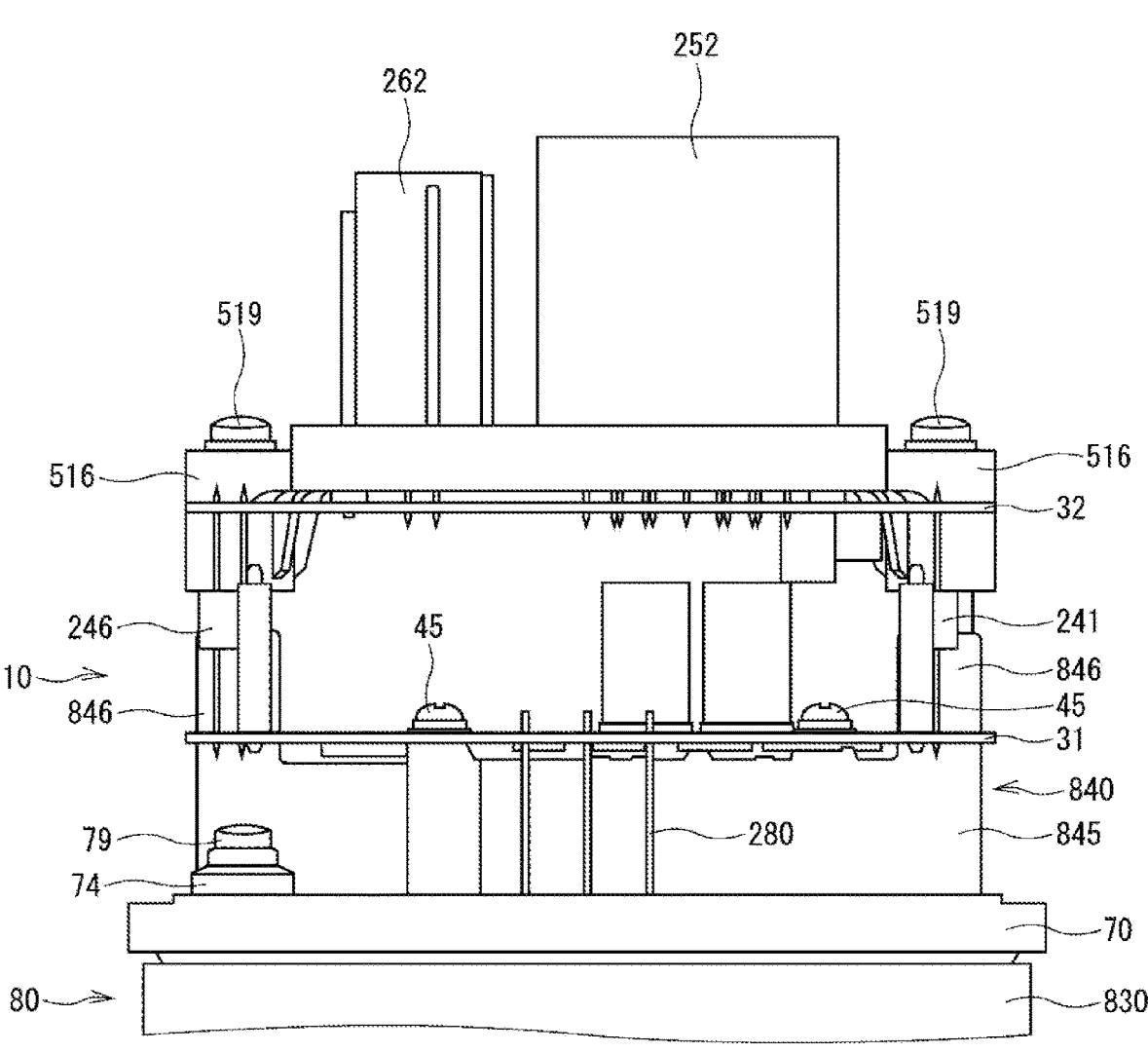
FIG. 5 is a diagram illustrating a side view of an ECU, from which a cover is removed, according to the first embodiment.

As shown in FIG. 4, the motor 80 has a motor case 830, a motor frame 840, a stator 860, a rotor 865, and the like.

The stator 860 is fixed to the motor case 830 and has the motor windings 180, 280 wound thereon. The rotor 865 is provided radially inside the stator 860 and is provided rotatably relative to the stator 860.

The shaft 870 is fitted firmly in the rotor 865 to rotate integrally with the rotor 865. The shaft 870 is rotatably supported by the motor case 830 and the motor frame 840 by the bearings 871 and 872. An end portion of the shaft 870 on the side of the ECU 10 is inserted through a shaft hole 849 formed in the motor frame 840 and exposed to the side of the ECU 10. A magnet 875 is placed at the end of the shaft 870 on the ECU 10 side.

The motor case 830 is formed in a substantially bottomed tubular shape including a bottom portion 831 and a cylindrical portion 832, and the ECU 10 is provided on an opening side. The bearing 871 is provided on the bottom portion 831. The stator 860 is fixed to the cylindrical portion 832.

The motor frame 840 has a frame portion 841, a heat sink 845, a connector connecting portion 846, and the like, and is made of a material with good thermal conductivity such as aluminum. The frame portion 841 is press-fitted radially inward of the motor case 830, and as a whole is within a projected area (hereinafter referred to as "motor silhouette" as appropriate) obtained by projecting the cylindrical portion 832 of the motor case 830 in the axial direction. A flange portion 842 is formed on the outer circumference of the frame portion 841 and contacts a stepped portion 833 formed on the inner wall of the cylindrical portion 832. An extension member connection portion 843 is formed outside the heat sink 845 of the frame portion 841.

Figure 6:
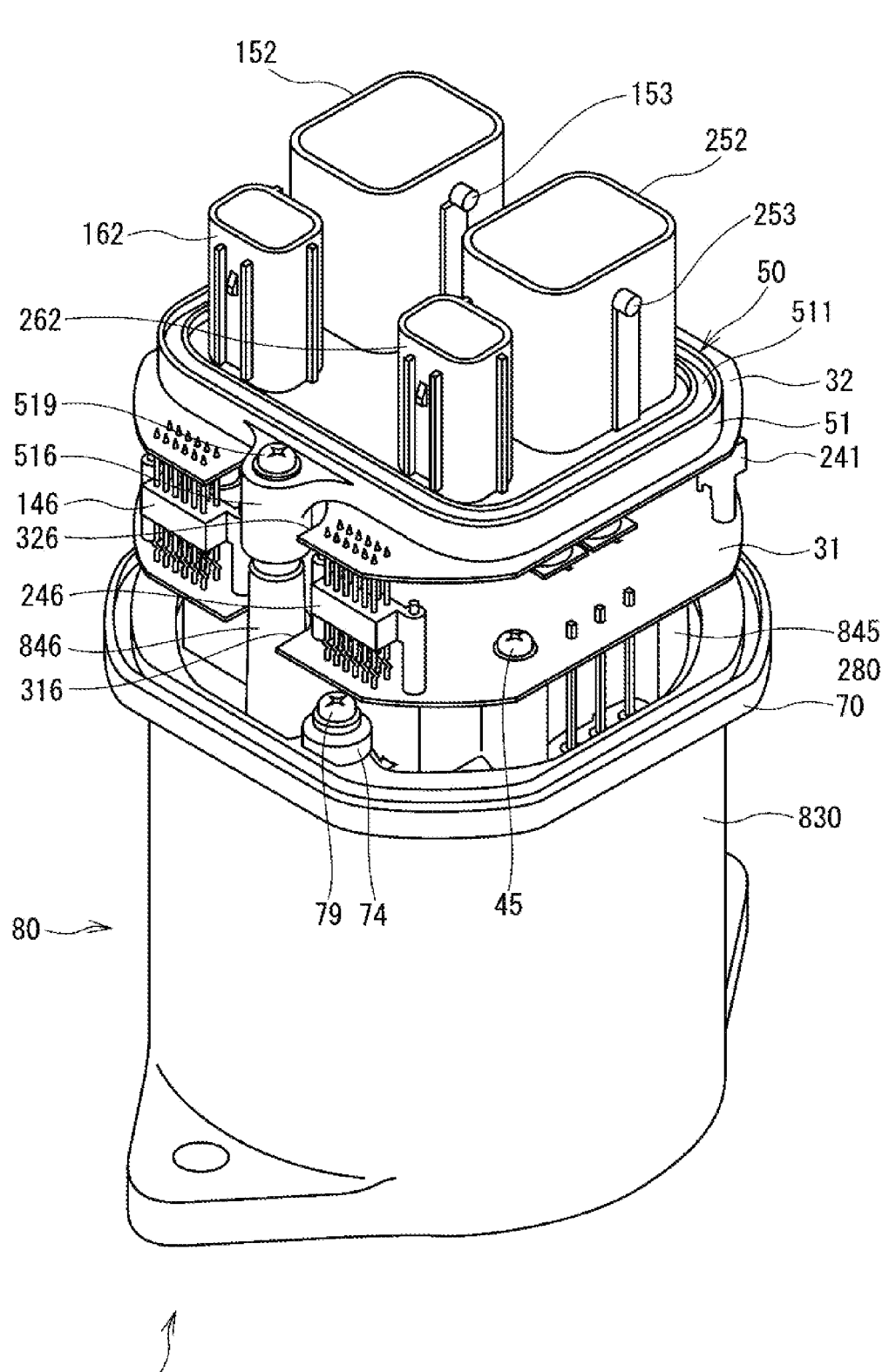
FIG. 6 is a perspective view illustrating the drive device, from which a cover is removed, according to the first embodiment.

As shown in FIG. 6, the connector connection portion 846 is erected substantially in a center of the side surface of the heat sink 845 from which the motor windings 180 and 280 are not taken out. A height of the connector connection portion 846 is higher than the heat sink 845.

As shown in FIGS. 4 to 7, the ECU 10 has a main board 31, a sub board 32, power system connection components 141, 241, signal system connection components 146, 246, a connector unit 50, a cover 60, and the like. The main board 31 is fixed to the end surface of the heat sink 845 with a fastening member 45. The sub board 32 is fixed to the connector unit 50. The main and sub boards 31 and 32 are larger than the heat sink 845 when projected in the axial direction, and are formed to extend to the outside of the heat sink 845.

On a surface of the main board 31 on the side of the heat sink 845, a switching element or the like that constitutes an inverter for switching energization of the motor windings 180 and 280 is mounted, and are provided to the heat sink 845 so as to be capable of dissipating heat. A component such as an aluminum electrolytic capacitor is mounted on a surface of the main board 31 opposite to the heat sink 845.

The main board 31 is formed with relief recesses 316 for avoiding interference with the connector connecting portion 846. The main board 31 is divided into two areas by a virtual line passing through the relief recess 316 and the center of the main board 31, the electronic components related to the first system are mounted on one side, and the electronic components related to the second system are mounted on the other side. The same applies to the sub board 32 as well. Hereinafter, as appropriate, an area where the components related to the first system are mounted including a projected area in the axial direction is defined as the first system area, and an area where the components related to the second system are amounted including a projected area in the axial direction is defined as a second system area. A line separating the first system and the second system is defined as a system dividing line Lc.

On the sub board 32, components such as a choke coil and a capacitor constituting a filter circuit, and a communication driver are mounted. The sub board 32 is formed with a relief recess 326 for relief of a fixing portion 516 of the connector unit 50, which will be described later.

The main board 31 and the sub board 32 are connected by power system connection components 141 and 241 and signal system connection components 146 and 246. The power system connection components 141 and 241 and the signal system connection components 146 and 246 may be a board-to-board (B to B) connector, a pin header, or other configurations that can provide electrical continuity.

The power system connection components 141 and 241 are arranged on both sides of the relief recesses 316 and 326 along the same side in an outer area outside the area where various elements such as switching elements are mounted. The signal system connection components 146 and 246 are arranged along the side opposite to the side where the power system connection components 141 and 241 and provided on both sides of the relief recesses 316 and 326 in an outer area outside the area where various elements are mounted.

The connector unit 50 has a base portion 51, vehicle system connectors 152 and 252, and steering connectors 162 and 262. The base portion 51 is formed in a substantially rectangular shape in a plan view. A groove portion 511 is formed along the outer edge of the surface of the base portion 51 opposite to the motor 80. A board insertion portion 512 to be inserted into the sub board 32 is formed on the surface of the base portion 51 on the side of the motor 80 (see FIG. 7). The sub board 32 and the connector unit 50 are positioned by inserting the board insertion portion 512 into the sub board 32. The board insertion portion 512 may be fixed to the sub board 32 by welding or the like. Also, the sub board 32 may be fixed to the connector unit 50 by a fixing member such as a screw as in a third embodiment described later.

A fixing portion 516 is formed on the base portion 51. A through bolt 519 is inserted through the fixing portion 516 and screwed to the connector connection portion 846 of the motor frame 840. The connector unit 50 is thereby fixed to the motor frame 840. A connection position in the axial direction between the connector connecting portion 846 of the motor frame 840 and the fixing portion 516 of the connector unit 50 is between the main board 31 and the sub board 32. Details of the connector unit 50 will be described later.

The cover 60 is formed in a substantially cylindrical shape with a bottom, and accommodates the main and sub boards 31 and 32, the heat sink 845 and the like inside. A substantially rectangular hole 61 is formed at a bottom of the cover 60. The connectors 152, 162, 252, and 262 are inserted through the holes 61. An end portion 611 of the hole 61 is bent inward. The end portion 611 is inserted into the groove portion 511 of the connector unit 50, and an adhesive member such as an adhesive is coated on the groove portion 511. As a result, it is possible to prevent water droplets and dust from entering between the connector unit 50 and the cover 60.

An extension member 70 includes a base portion 71, an annular protrusion 72, a cover insertion groove 73, a fixing portion 74, and the like, and is integrally formed of resin or the like. The extension member 70 is formed in an annular shape as a whole, and is arranged on the ECU 10 side of the frame portion 841 of the motor frame 840 and radially outside the heat sink 845. In other words, the heat sink 845 is formed on the inner peripheral side of the extension member 70 so as to protrude toward the ECU 10 side. At least part of the outer edge of the extension member 70 is located outside a motor silhouette.

The annular protrusion 72 is provided on the surface of the base portion 71 on the motor 80 side so as to protrude along the inner peripheral surface of the base portion 71, and is inserted into the cylindrical portion 832 of the motor case 830. The cover insertion groove 73 is formed along the outer edge of the surface of the extension member 70 opposite to the motor 80. An end portion of the cover 60 on the opening side is inserted into the cover insertion groove 73 to which an adhesive member such as an adhesive material is applied. As a result, entry of water droplets, dust, etc. from between the expansion member 70 and the cover 60 can be prevented. In the present embodiment, the seals are made at three points: a connecting portion between the motor frame 840 and the extension member 70, a connecting portion between the extension member 70 and the cover 60, and a connecting portion between the connector unit 50 and the cover 60.

The fixing portion 74 is formed to protrude radially inward from an inner peripheral wall of the extension member 70. A collar is inserted into the fixing portion 74 and fixed to the frame portion 841 with a screw 79. By providing the extension member 70, since the ECU 10 can be extended to the outside of the motor silhouette, a large mounting area for the boards 31 and 32 can be secured, as compared with the case where the extension member 70 is not provided. Thereby, the degree of freedom in designing the boards 31, 32 and the like can be increased.

Figure 7:
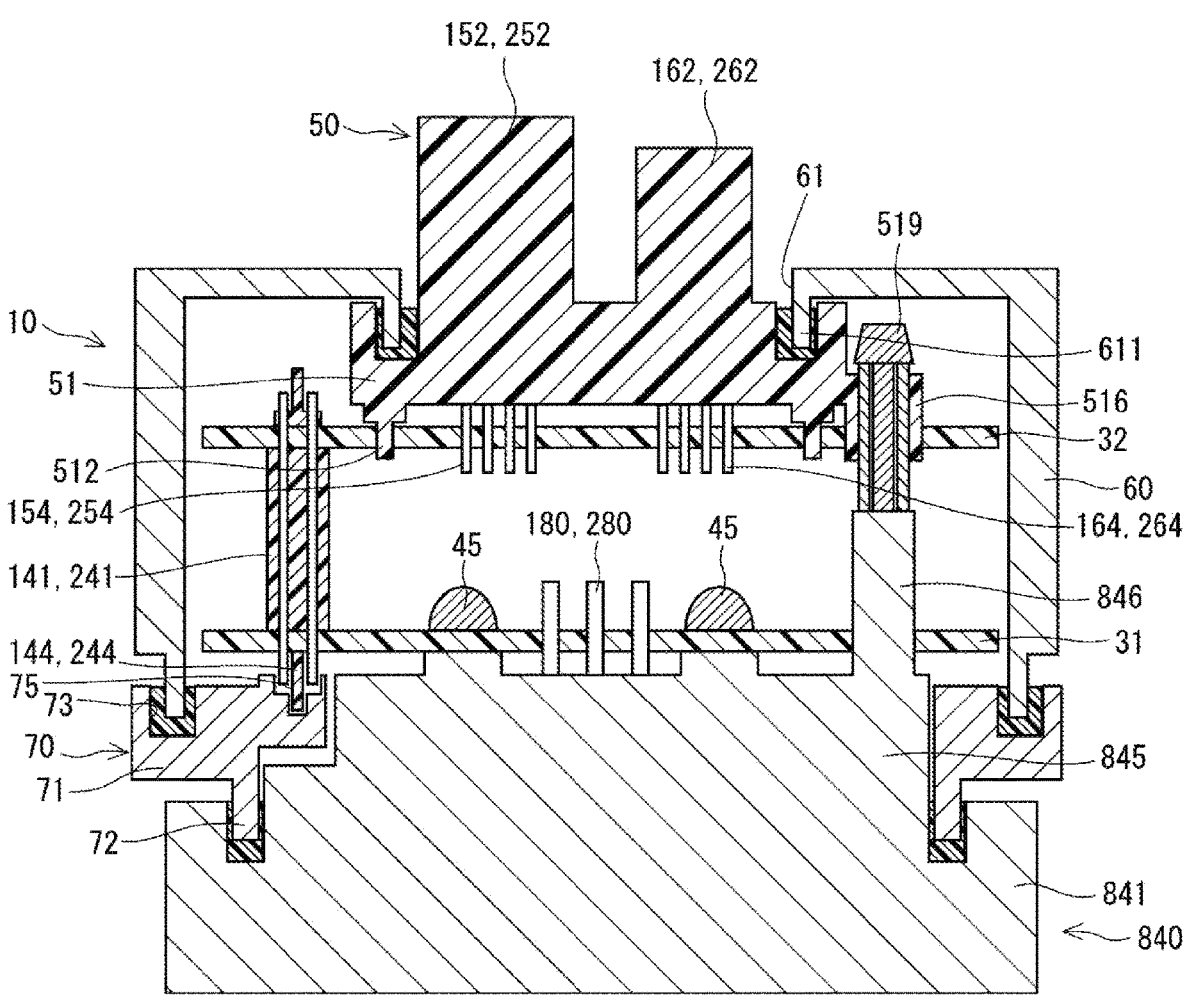
FIG. 7 is a schematic cross-sectional view illustrating an ECU according to the first embodiment.

As shown in FIG. 7, a concave portion 75 is formed on the surface of the base portion 71 facing the main board 31 and radially inward of the cover insertion groove 73. The concave portion 75 is deeper at a central part than at a peripheral edge. A board connection terminal 142 of the power system connection component 141 is arranged on the peripheral edge of the concave portion 75. Further, positioning pins 144 and 244 of the power system connection components 141 and 241 are inserted into the central part of the concave portion 75. The positioning pins 144 and 244 pass through the boards 31 and 32. By providing the positioning pins 144 and 244, the boards 31 and 32 and the extension member 70 and the power system connection components 141 and 241 can be positioned. Although not shown in FIG. 7, the signal system connection components 146 and 246 are also substantially the same as the power system connection components 141 and 241 except for the shape of the terminals. FIG. 7 is a schematic cross-sectional view, and for the sake of explanation, it is described without distinguishing between systems.

Figure 3:
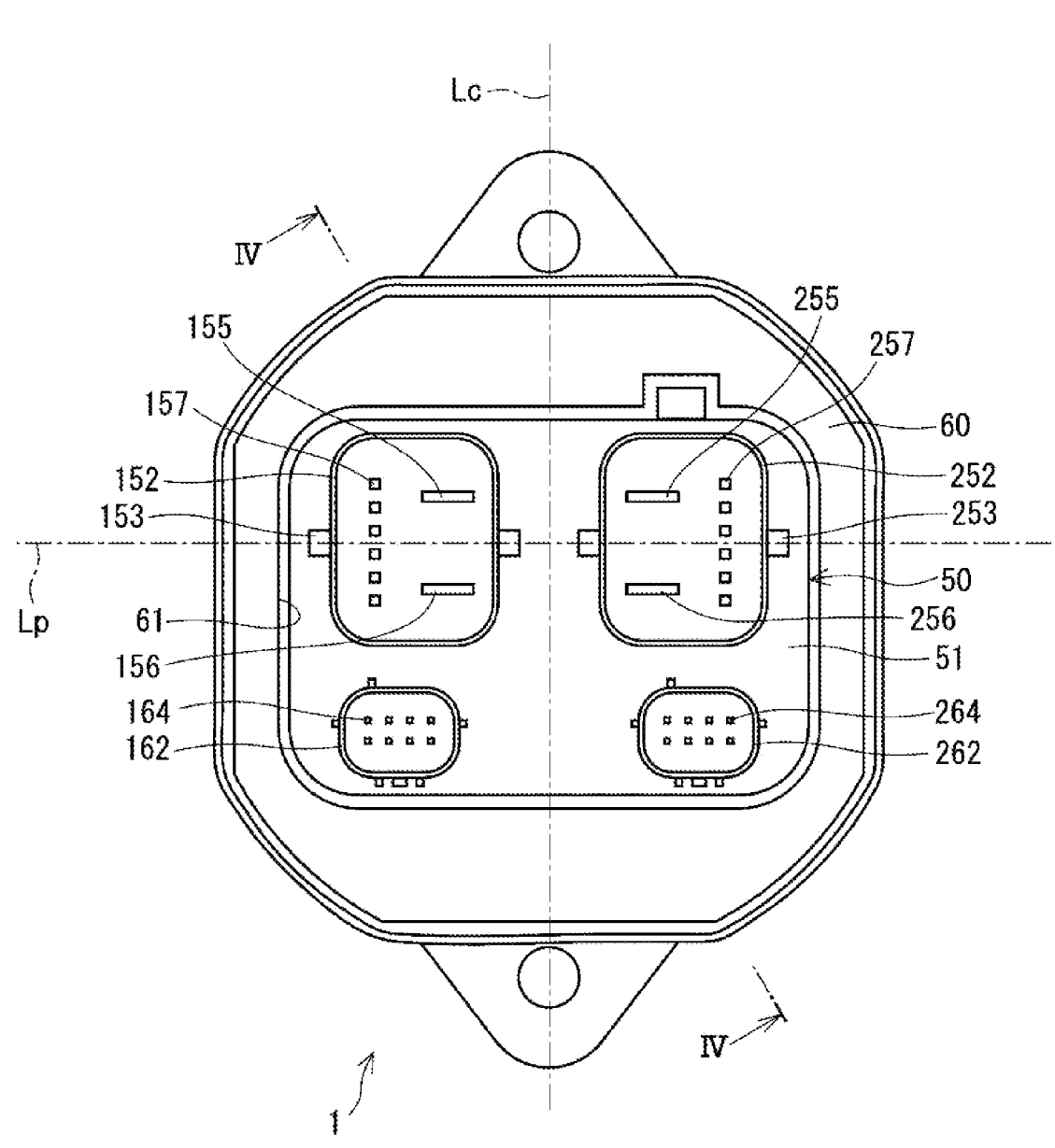
FIG. 3 is a diagram seen from a direction of an arrow III in FIG. 2.

As shown in FIGS. 3 and 7, the connectors 152, 162, 252, and 262 are erected along the axial direction from the base portion 51, and the openings are formed facing outward in the axial direction. The vehicle system connectors 152 and 252 are integrated-type hybrid connectors in which a power system connector connected to a vehicle power supply and a ground and a communication system connector connected to a vehicle communication network 6 (see FIG. 1) such as a controller area network (CAN) are integrated.

The vehicle system connector 152 and the steering system connector 162 of the first system are used for power supply to the first motor winding 180 and signal transmission related to energization control, and the vehicle system connector 252 and the steering system connector 262 of the second system are used for power supply to the second motor winding 280 and signal transmission related to power supply control. In the present embodiment, the control components such as the microcomputer and the power supply path are made redundant. However, when the control part and the power supply path are made in one system, one of the vehicle system connectors 152 and 252 is buried by potting or the like. In other words, when the power supply from a vehicle power supply 5 and the information acquired by communication with the vehicle communication network 6 are commonly used for the energization control of the two sets of motor windings 180 and 280, one of the vehicle system connectors 152 and 252 is buried unconnectable. Therefore, parts can be shared. Also, when there is only one system of control parts and power supply path, one of the vehicle system connectors 152 and 252 may be eliminated. The steering system connectors 162 and 262 are also the same as the vehicle system connectors 152 and 252.

The vehicle system connectors 152 and 252 are provided with vehicle system terminals 154 and 254 that are connected to the sub board 32. The vehicle system terminals 154, 254 include the power terminals 155, 255, the ground terminals 156, 256, and the communication terminals 157, 257, respectively. In the present embodiment, the number of each of the communication terminals 157 and 257 is six, and the vehicle system connectors 152 and 252 are each provided with a total of eight terminals.

The steering system connectors 162, 262 include the sensor terminals 164, 264 connected to the sub board 32. In the present embodiment, the number of each of the sensor terminals 164 and 264 is eight. The connection between the vehicle system terminals 154, 254 and the sub board 32 and the connection between the sensor terminals 164, 264 and the sub board 32 are performed by press-fitting, socket connectors, or the like, so long as electrical continuity can be achieved.

In the present embodiment, the vehicle system connectors 152 and 252 and the steering system connectors 162 and 262 have separate openings. Therefore, the connection between the vehicle system connectors 152 and 252 and the vehicle power supply 5 and the vehicle communication network 6 and the connection between the steering system connectors 162 and 262 and the torque sensor 93 can be performed separately.

Specifically, when the drive device 1 is assembled to the steering shaft 92 to assemble the electric power steering device 8, the steering system connectors 162 and 262 and the torque sensor 93 are connected by the harness 94. After that, the electric power steering device 8 is mounted on the vehicle, and the vehicle system connectors 152 and 252 are connected to the vehicle power supply 5 and the vehicle communication network 6. As a result, various inspections can be performed on the electric power steering device 8 in a gear assembly state.

In the boards 31 and 32, the components related to the first system and the components related to the second system are arranged in separate areas. When projected in the axial direction, the vehicle system connector 152 and the steering system connector 162 are provided on the first system area side, and the vehicle system connector 252 and the steering system connector 262 are provided on the second system area side. The vehicle system connectors 152 and 252 are arranged side by side on both sides of the system dividing line Lc. Similarly, the steering system connectors 162, 262 are arranged side by side on both sides of the system dividing line Lc.

The vehicle system connectors 152 and 252 are connected to the vehicle power supply 5 and the vehicle communication network 6 by being fitted with connectors (not shown).

Lock pins 153, 253 that engage with the levers of the connectors protrude from the side walls of the vehicle system connectors 152, 252, respectively. The lock pins 153, 253 are formed on a straight line Lp orthogonal to the system dividing line Lc. That is, the lock pins 153 and 253 are arranged on the same straight line. Here, "on the same straight line" means that a deviation of about a manufacturing error is allowed. The same applies to terms such as orthogonal. By forming the lock pins 153 and 253 on the same straight line, the mold used for molding the connector unit 50 can be simplified.

Figure 14:
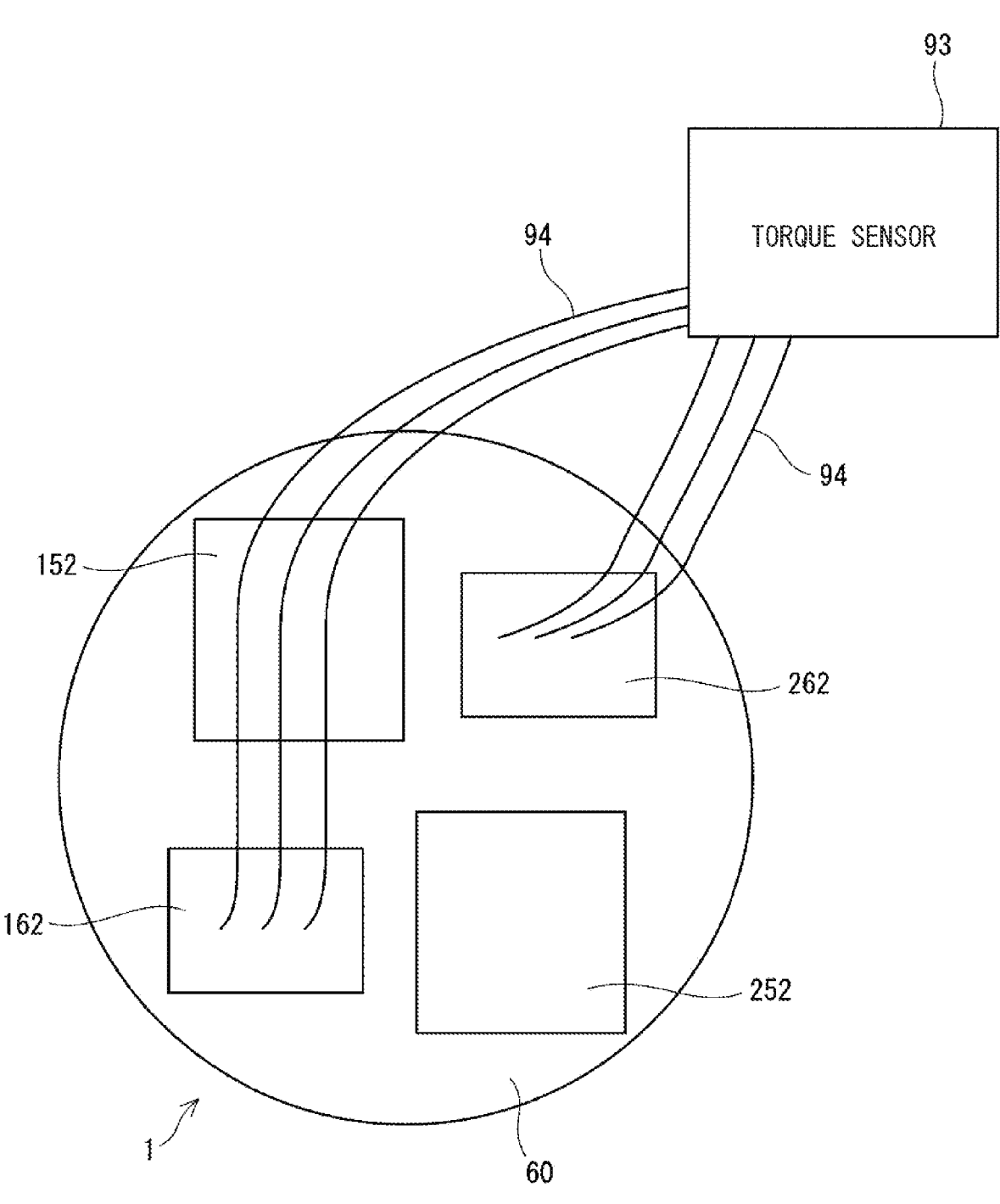
FIG. 14 is a schematic plan view illustrating a connector arrangement according to a reference example.

Here, in the reference example shown in FIG. 14, the vehicle system connector 152 and the steering system connector 262 are arranged side by side, and the vehicle system connector 252 and the steering system connector 162 are arranged side by side. When the steering system connectors 162, 262 are arranged in a crossed state as in the reference example, the harness 94 may pass through an upper surface of the opening of the vehicle system connectors 152, 252 when the steering system connectors 162, 262 and the torque sensor 93 are assembled. If the harness 94 pass through the upper surface of the opening of the vehicle system connectors 152, 252, the harness 94 must be avoided when fitting the vehicle system connectors 152, 252 and the connector. Therefore, it becomes difficult to assemble the vehicle system connectors 152, 252 and the connector.

In the present embodiment, the vehicle system connectors 152 and 252 are arranged side by side, and the steering system connectors 162 and 262 are arranged side by side. Therefore, by connecting the harness 94 from the side of the steering system connectors 162 and 262, the harness 94 can be prevented from crossing the upper surface of the opening of the vehicle system connectors 152 and 252.

Further, in the present embodiment, the vehicle system connectors 152 and 252 are formed taller than the steering system connectors 162 and 262 from the base portion 51. The steering system connectors 162, 262 to be assembled first are formed low, and the vehicle system connectors 152, 252 to be assembled later are formed high. As a result, assembly of the vehicle system connectors 152, 252 and the connector is less likely to be hindered.

As described above, the drive device 1 includes the motor 80 having two sets of motor windings 180 and 280 and the ECU 10. The ECU 10 has the boards 31 and 32 on which electronic components related to control of energization to the motor windings 180 and 280 are mounted, a connector unit 50, and a cover 60 that covers control components including the boards 31 and 32, and is provided on one side of the motor 80 in the axial direction.

The connector unit 50 has two vehicle system connectors 152, 252 and at least one steering system connector 162, 262 used for connection with the outside, and these openings are provided so as to face the side opposite to the motor 80. The vehicle system connectors 152, 252 are connected to the vehicle power source 5 and the vehicle communication network 6. The steering system connectors 162, 262 are provided with an opening separate from that of the vehicle system connectors 152, 252, and are connected to a separate member (the torque sensor 93 in the present embodiment). That is, in the present embodiment, the openings of the steering system connectors 162 and 262 are not integrated with the openings of the vehicle system connectors 152 and 252.

In the present embodiment, the openings of the vehicle system connectors 152, 252 and the openings of the steering system connectors 162, 262 are separately provided. Therefore, the assembling timing can be shifted such that the vehicle system connectors 152 and 252 are connected to the vehicle power supply 5 and the like after the steering system connectors 162 and 262 and the torque sensor 93 are connected. As a result, the assembling efficiency can be improved.

The vehicle system connectors 152 and 252 are provided with two or more power supply terminals and two or more communication terminals 157 and 257. The power supply terminals are the power supply terminals 155 and 255 and the ground terminals 156 and 256. Further, the steering system connectors 162, 262 are provided with three or more sensor terminals 164, 264, respectively. Specifically, the power supply terminal includes at least a power supply terminal and a ground terminal, the communication terminal includes at least a terminal for one channel of CAN communication, and the sensor terminal includes at least a power supply terminal, a ground terminal, and a signal terminal. In the present embodiment, by unitizing connectors having a relatively large number of terminals, it is possible to make the physical size relatively small even if the openings are divided.

The lock pins 153, 253 that engage with the levers of the connectors to be connected are provided on the side walls of the vehicle system connectors 152, 252, respectively. The four lock pins 153, 253 provided on the two vehicle system connectors 152, 252 are formed on the same straight line. Thereby, the mold used for molding the connector unit 50 can be simplified.

The vehicle system connectors 152 and 252 are formed taller than steering system connectors 162 and 262. As a result, even after the steering system connectors 162, 262 are connected, the harness 94 is less likely to interfere with the connection of the vehicle system connectors 152, 252, and an assemblability can be improved.

The connector unit 50 is provided separately from the cover 60 and fixed to a motor frame 840 provided at one end of the motor 80. For example, the connector unit 50 can be firmly fixed to the motor 80 by using a through bolt 519 or the like.

Second Embodiment

Figure 8:
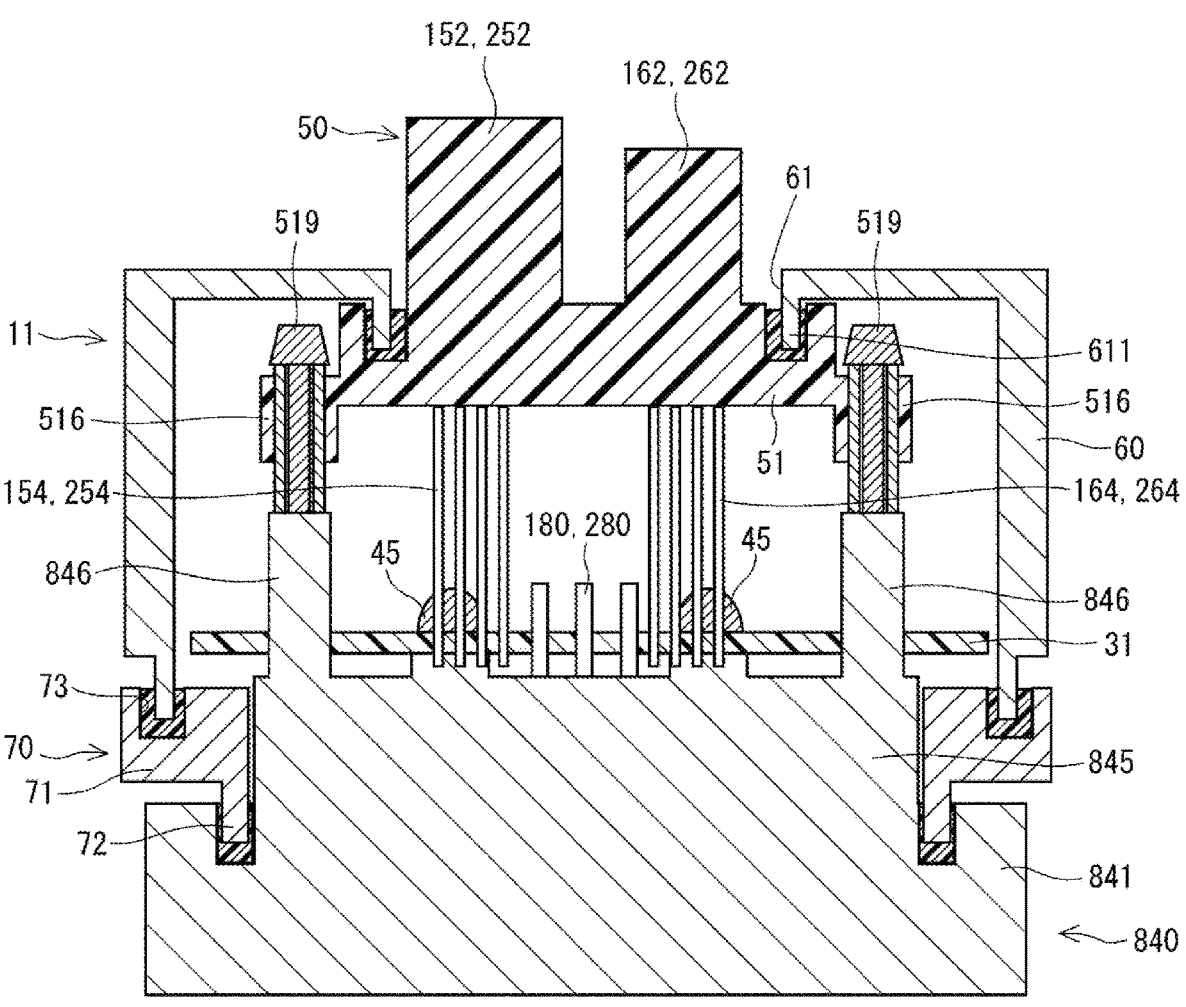
FIG. 8 is a schematic cross-sectional view illustrating an ECU according to a second embodiment.

A second embodiment is shown in FIG. 8. In the ECU 11, the sub board 32 and the connection components connecting the boards 31 and 32 are omitted, and the vehicle system terminals 154 and 254 and the sensor terminals 164 and 264 are connected to the main board 31. In the present embodiment, there is one board and no sub board 32 is provided, and for the sake of convenience, one board is assumed to be the main board 31. The same applies to a fourth embodiment. The same effects as those of the above embodiments can be obtained even in the configuration described above.

Third Embodiment, Fourth Embodiment

Figure 9:
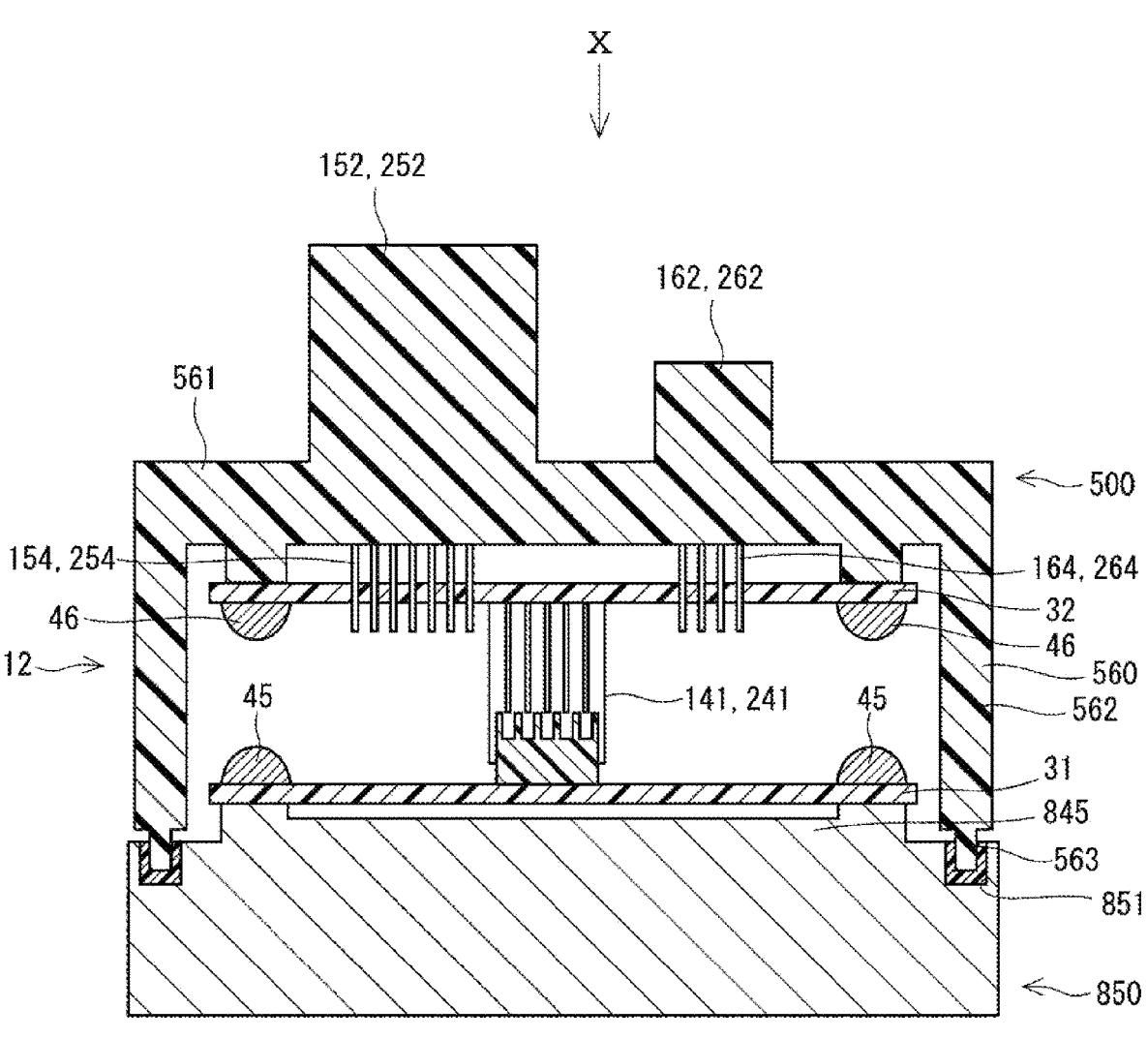
FIG. 9 is a schematic cross-sectional view illustrating an ECU according to a third embodiment.
Figure 10:
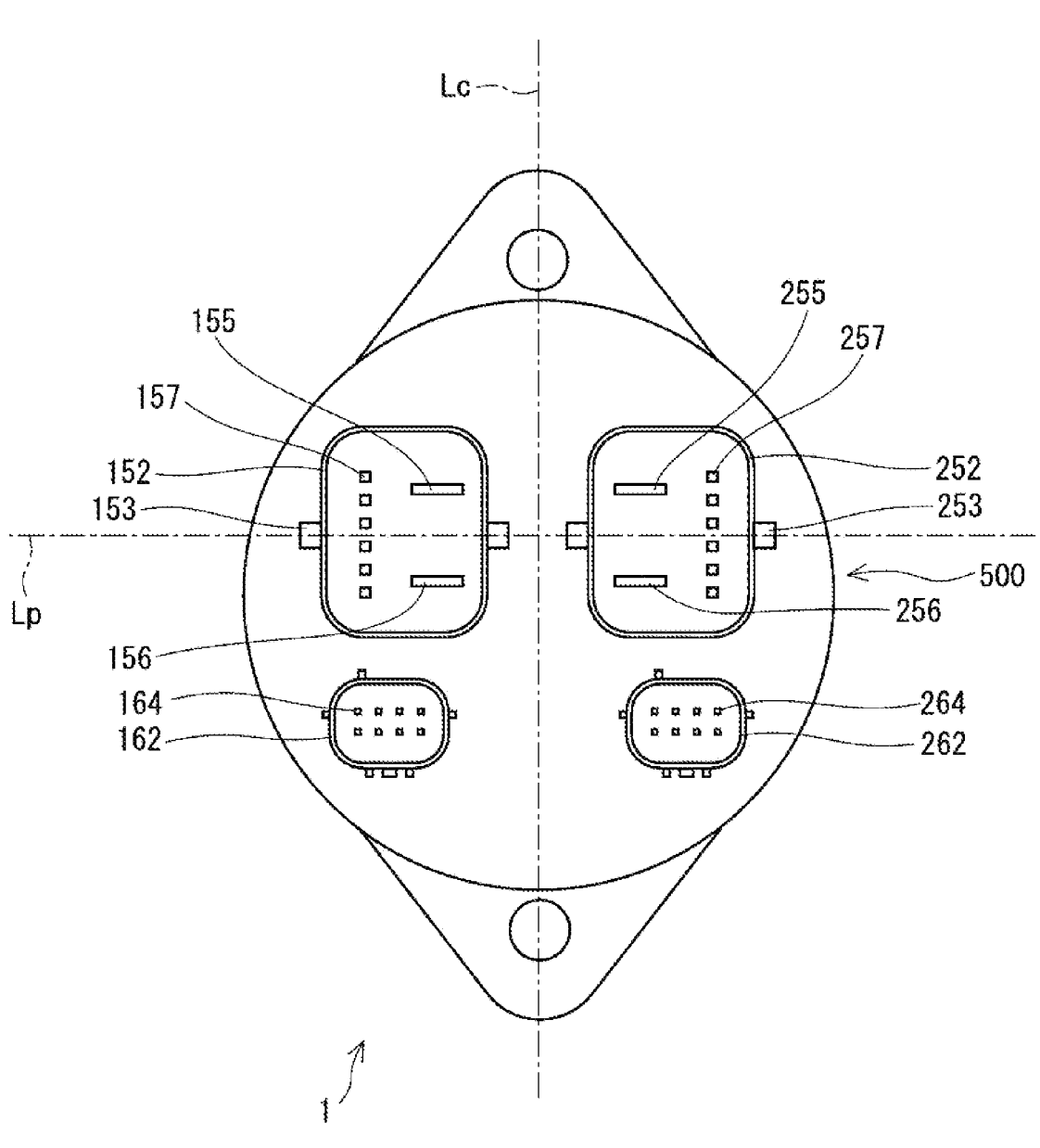
FIG. 10 is a diagram seen from a direction of an arrow X in FIG. 9.

The third embodiment is shown in FIGS. 9 and 10. The ECU 12 has a connector unit 500. In the connector unit 500, the vehicle system connectors 152, 252, the steering system connectors 162, 262, and a cover portion 560 are integrally formed of resin or the like. The cover portion 560 is formed in a substantially cylindrical shape with a bottom, and the vehicle system connectors 152 and 242 and the steering system connectors 162 and 262 are provided upright in the axial direction on the outside of the bottom portion 561 in the axial direction.

The sub board 32 is fixed to the connector unit 500 by fastening members 46 such as screws. The method of fixing the sub board 32 may be the same as in the first embodiment.

Figure 11:
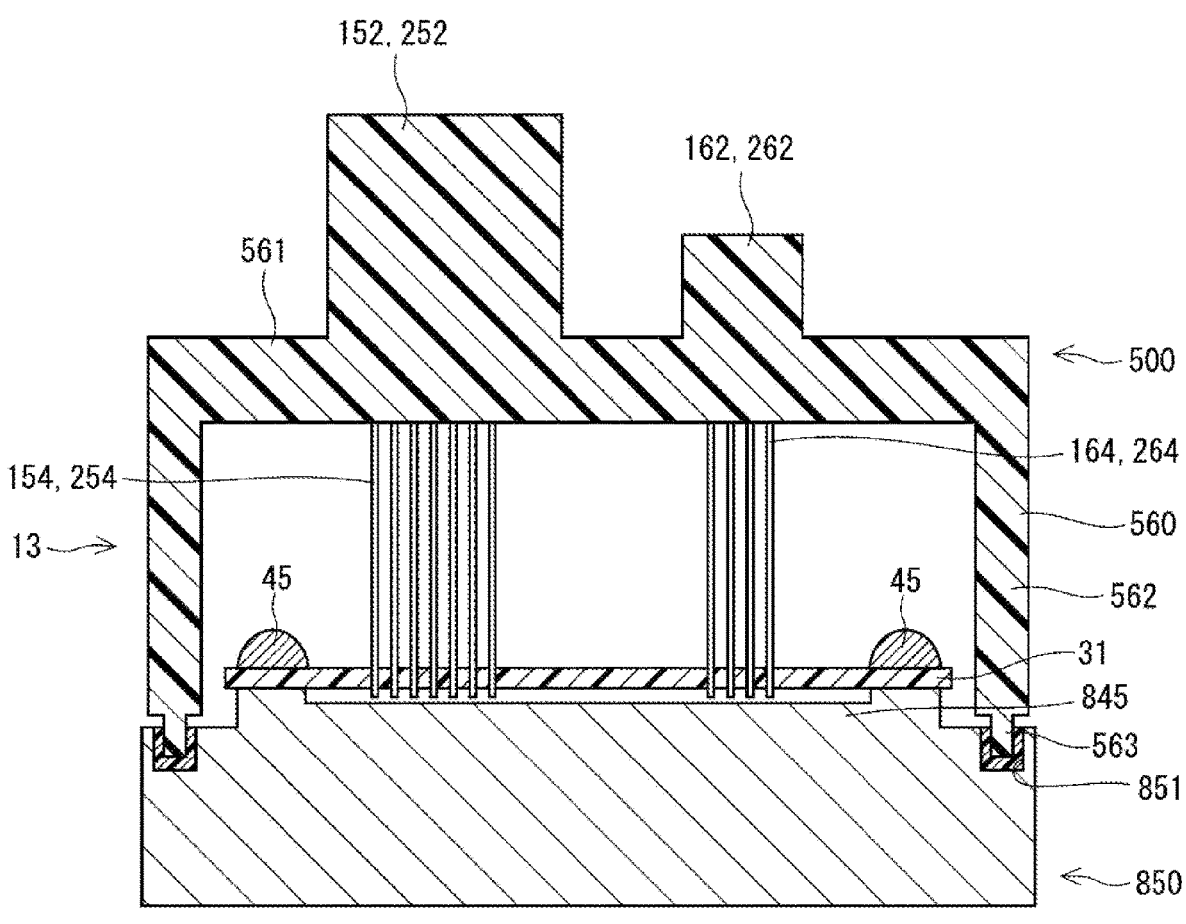
FIG. 11 is a schematic cross-sectional view illustrating an ECU according to a fourth embodiment.

Further, the sub board 32 may be omitted like the ECU 13 according to the fourth embodiment shown in FIG. 11.

In the present embodiment, the extension member 70 is omitted, and a protrusion 563 formed at a tip of a cylindrical portion 562 of the cover portion 560 is inserted into a seal groove 851 formed in the motor frame 850. By applying an adhesive or the like to the seal groove 851, a connecting portion between the motor frame 850 and the connector unit 500 is sealed. Thereby, the connector unit 500 is provided so as to be accommodated within the motor silhouette.

In the present embodiment, the connector unit 500 is provided integrally with the cover portion 560. The protrusion 563 formed at the tip of the cylindrical cover portion 560 is inserted into the seal groove 851 formed in the motor frame 840. By using the connector unit 500 in which the vehicle system connectors 152, 252, the steering system connectors 162, 262, and the cover portion 560 are integrally formed, the number of sealing portions can be reduced. In addition, the degree of freedom in arranging the vehicle system connectors 152, 252 and the steering system connectors 162, 262 increases. In addition, the same effects as those of the above embodiment can be obtained.

Fifth Embodiment, Sixth Embodiment

Figure 12:
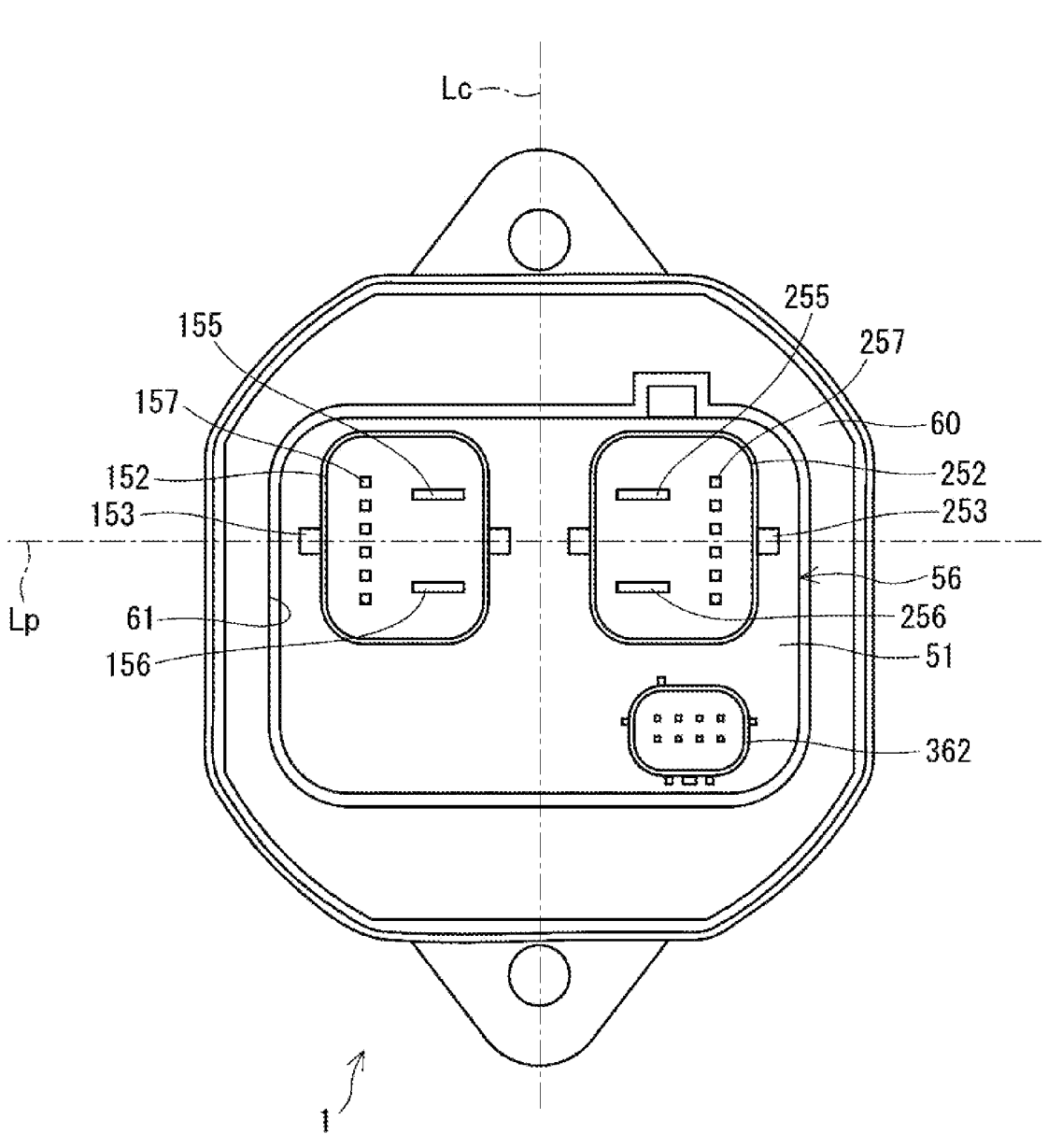
FIG. 12 is a plan view illustrating a connector arrangement according to a fifth embodiment.
Figure 13:
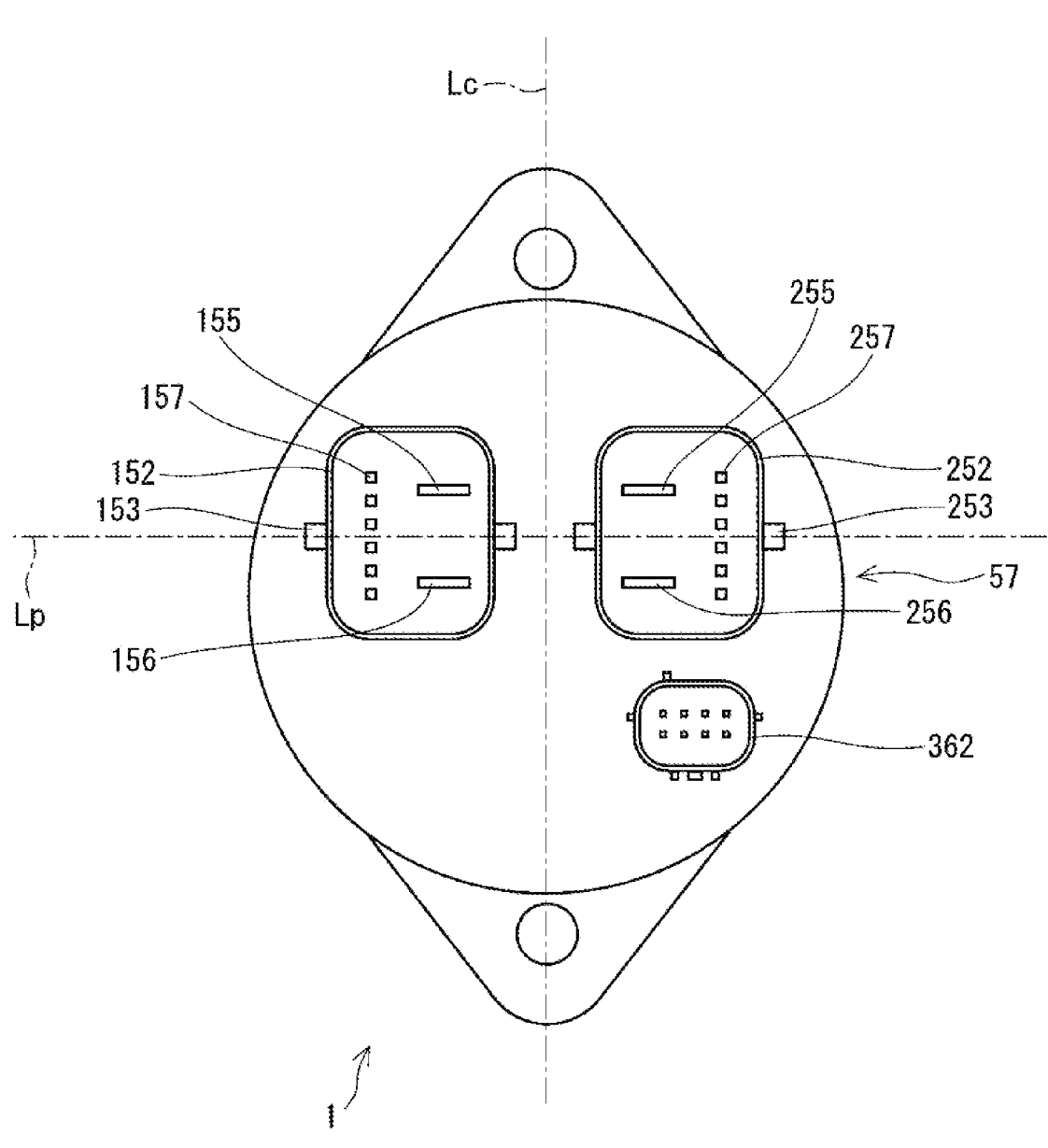
FIG. 13 is a plan view illustrating a connector arrangement according to a sixth embodiment.

FIG. 12 shows the fifth embodiment and FIG. 13 shows the sixth embodiment. FIG. 12 is a diagram corresponding to FIG. 3, and is the same as the first embodiment except for the connector unit. In the connector unit 56 of the fifth embodiment shown in FIG. 12, the steering system connector 362 is formed by integrating the openings of two systems into one. FIG. 13 is a diagram corresponding to FIG. 10, and is the same as the third embodiment except for the connector unit. In the connector unit 57 of the sixth embodiment shown in FIG. 13, as in the fifth embodiment, the steering system connector 362 is formed by integrating the openings of two systems into one. In FIGS. 12 and 13, the steering system connector 362 is provided on the second system area side, but it may be provided on the first system area side, or may be provided so as to straddle the system division line Lc. The same effects as those of the above embodiments can be obtained even in the configuration described above.

In the present embodiment, the vehicle power supply 5 corresponds to the "power supply", the vehicle communication network 6 corresponds to the "communication network", the ECUs 10 to 13 correspond to the "control unit", the vehicle system connectors 152 and 252 correspond to the "main connector", the steering system connectors 162, 262 and 362 correspond to the "sub connector", the power supply terminals 155 and 255 and the ground terminals 156 and 256 correspond to the "power supply terminal", and the sensor terminals 164 and 264 correspond to the "connection terminal". The cover 60 and the cover portion 560 correspond to the "cover member", and the seal groove 851 corresponds to the "groove portion". Although the main connector and the sub connector are referred to as "main" and "sub" for distinction, they need only be connected to separate members, and functionally, the relationship between the main and the sub is not necessarily required.

Other Embodiments

In the vehicle system connector of the above embodiments, the power system connector and the communication system connector are integrated. In another embodiment, as the main connector, the power system connector and the communication system connector may be separate bodies, and two of each may be provided.

In the above embodiments, the vehicle system connector is provided with two power supply terminals and six communication terminals, and the steering system connector is provided with eight sensor terminals. In another embodiment, two terminals, ie, a power supply terminal and a ground terminal, may be provided as power supply terminals, and two or more communication terminals may be provided for one channel of CAN communication, and the number of terminals may be different. The communication network may be other than CAN. Moreover, the number of terminals may be different as long as the sensor terminals of the steering system connector are three or more of the power supply terminal, the ground terminal and the signal terminal. Also, the terminal arrangement may be different from the above embodiments.

In the above embodiment, the sub connector is the steering system connector and is connected to the torque sensor. In another embodiment, the sensor to which the steering system connector is connected may be a sensor in the steering device other than a torque sensor such as a steering sensor. Also, the sub connector may be used to connect to a device other than the sensor, such as another actuator.

In the above embodiments, the steering device is the electric power steering device. In other embodiments, the steering device may be a steer-by-wire device, and the drive device may be used as a steering device for steering the wheels or as a reaction force device for applying a reaction force to the steering wheel. Also, the drive device may be applied to devices other than the steering device. The present disclosure is not limited to the embodiment described above but various modifications may be made within the scope of the present disclosure.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

What is claimed is:

1. A drive device, comprising:

a motor having two sets of motor windings; and a control unit including a board on which electronic components related to energization control to the motor windings are mounted, a connector unit having two main connectors and at least one sub connector used for connection with an outside, with openings of the two main connectors and the at least one sub connector facing away from the motor, and a cover member covering control components having the board;

wherein the control unit is provided on one side of the motor in an axial direction, each main connector is connected to a power supply and a communication network, and the two main connectors are equal in height, the at least one sub connector has an opening separate from an opening of each main connector and is connected to a separate member, and lock pins that engage with a lever of a connector to be connected are provided on side walls on both sides of each main connector, wherein a combination of components related to the energization control of one of the motor windings is referred to as a first system, and a combination of components related to the energization control of the other of the motor windings is referred to as a second system, a line separating the first system and the second system is defined as a system dividing line, and the lock pins of the two main connectors are formed on a same straight line orthogonal to the system dividing line.

2. The drive device according to claim 1, wherein each main connector is provided with two or more power supply terminals and two or more communication terminals, and the at least one sub connector is provided with three or more connection terminals.

3. The drive device according to claim 1, wherein two main connectors are taller than the at least one sub connector.

4. The drive device according to claim 1, wherein the connector unit is provided separately from the cover member and fixed to a motor frame provided at one end of the motor.

5. The drive device according to claim 1, wherein the connector unit is provided integrally with the cover member, and a protrusion formed at a tip of the cover member formed in a cylindrical shape is inserted into a groove portion formed in a motor frame provided at one end of the motor.

6. The drive device according to claim 1, wherein when the power supplied from the power supply and the information acquired by communication with the communication network are commonly used for the energization control of the two sets of motor windings, one of the two main connectors is buried unconnectable.

* * * * *